UNITED STATES PATENT OFFICE.

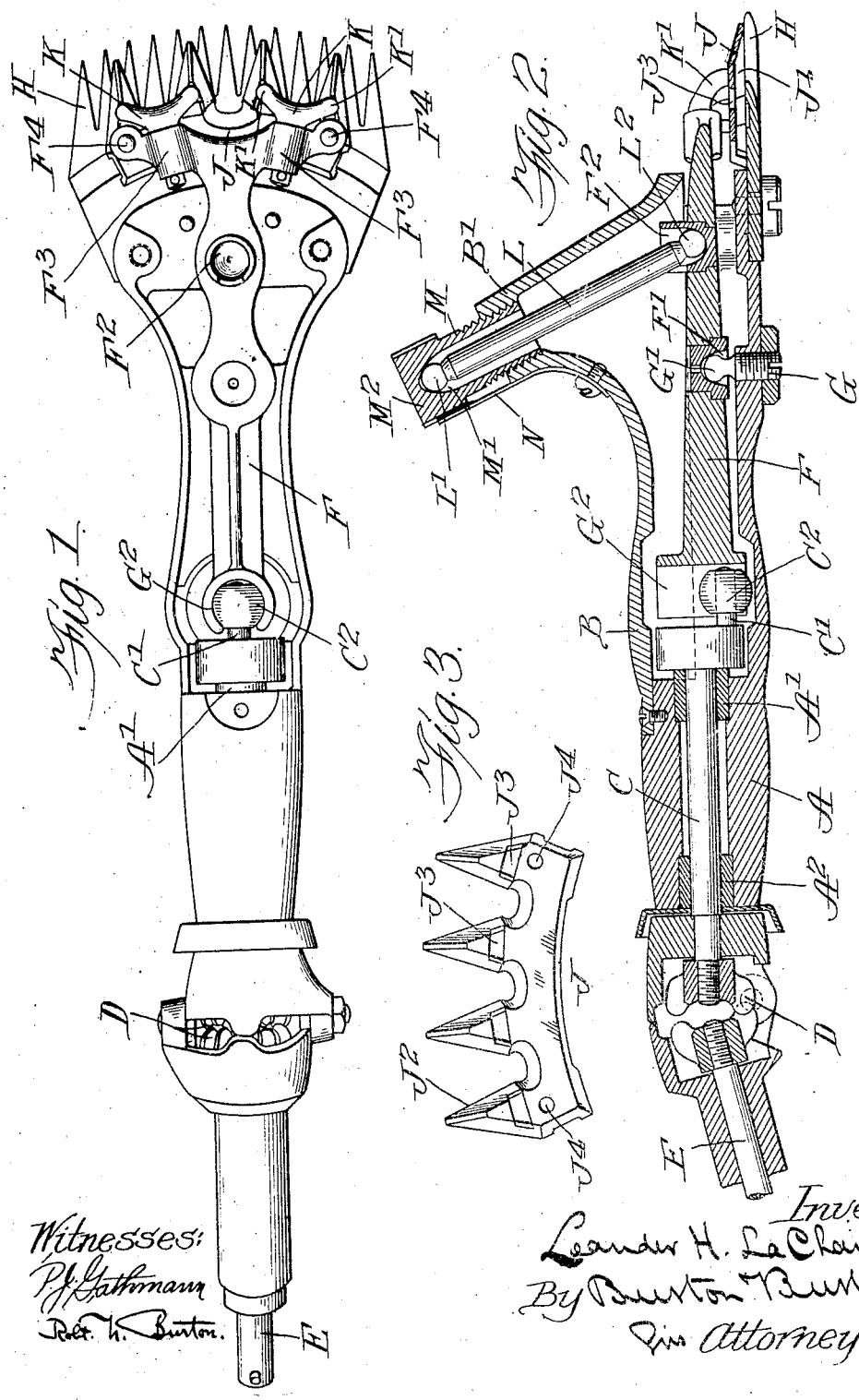

LEANDER H. LA CHANCE, OF CHICAGO, ILLINOIS, ASSIGNOR TO CHICAGO FLEXIBLE SHAFT COMPANY, OF CHICAGO, ILLINOIS, A CORPORATION OF ILLINOIS.

ANIMAL-SHEARS.

1,037,933.  Specification of Letters Patent.  Patented Sept. 10, 1912.

Application filed May 6, 1911. Serial No. 625,587.

*To all whom it may concern:*

Be it known that I, LEANDER H. LA CHANCE, a citizen of the United States, residing at Chicago, in the county of Cook and State of Illinois, have invented new and useful Improvements in Animal-Shears, of which the following is a specification, reference being had to the accompanying drawings, forming a part thereof.

This invention relates to clippers or shearing tools and it consists of features and construction described and shown in the drawings and indicated in the claim.

In the drawings:—Figure 1, is a top plan view of a shear with a part of the casing removed to show the interior mechanism. Fig. 2, is a medial section of the shear shown in Fig. 1. Fig. 3, is a detail plan view of a cutter.

In general the shears illustrated in the drawings are of familiar construction in which, A, is the main body casting and, B, is the removable cover which completes the inclosure of the operating parts. The operating shaft, C, is shown journaled in the body in plain bearings, $A^1$ and $A^2$, and connected through a universal gear coupling, D, with a power shaft, E. The cutter actuator, F, is shown fulcrumed for oscillation upon a post, G, set in the body, A, and having a ball-shaped end, $G^1$, which takes into a cup or recess, $F^1$, in the actuator arm so as to permit a limited amount of up and down adjustment of the arm about this pivot as well as the usual side to side oscillation or vibration. Such vibration is accomplished by the rotation of the crank wrist, $C^1$, with its anti-friction roller, $C^2$, engaging the vertical slot, $G^2$, of the lever arm.

Secured to the forward end of the body, A, is the comb or fixed cutter, H, in contact with which the movable cutter, J, is designed to be oscillated by the actuator, F. The cutter, J, is formed with four teeth, and to insure equal contact of all these teeth with the fixed cutter, the lever, F, is expanded at its forward end into two laterally extending branches, $F^3$, in each of which is pivotally mounted a bifurcated equalizer arm, K, having two fingers, $K^1$, formed to transmit pressure to two of the cutter teeth respectively. The cutter, J, is driven by the actuator, F, through the driving pins, $F^4$, engaging apertures, $J^4$, in the teeth.

The pressure above referred to as being transmitted by the fingers, $K^1$, to the vibrating cutter, is initiated through a dolly-pin, L, stepped at its lower end upon the actuator, F, forward of its pivot post, G, and controlled at its upper end by the adjustable sleeve, M, which is screwed into the cone-shaped hood, $B^1$, of the cover, B. The dolly-pin is formed with ball ends, $L^1$ and $L^2$, and the adjusting sleeve and actuator arm are provided with corresponding socket bearings, $M^f$ and $F^2$, respectively, the adjusting sleeve having a serrated head, $M^2$, by contact with which the spring dog, N, retains the sleeve in properly adjusted position.

It being understood that the operation of this device consists in vibratory oscillation of the actuator, F, and its cutter, J, about the pivot post, G, it will be seen that during such operation the bearing socket, $F^2$, will move in an arc of a circle described about the axis of the post, G, in a plane perpendicular thereto, and that the control of the upper end of the dolly-pin should be such as to cause the lower end to travel in this same arc, if uniform pressure between the cutters is to be maintained through the dolly-pin. This is effected by so locating the bearing seat, $M^1$, as to position the center of the upper ball end, $L^1$, of the dolly-pin in the line of the axis of the post, G, which is the fulcrum axis of the actuator arm, F. In other words, the axis of the dolly-pin is an element of a cone which might be described about the axis of the post, G, with the center of the ball, $L^1$, as an apex.

It will be observed that in case of wear of the cutter or of the ball and socket bearings of the dolly-pin, some adjustment of the sleeve, M, will be necessary to maintain contact between the cutter, J, and the comb, H; but, since such adjustment takes place along the axis of the dolly-pin instead of along the axis of the fulcrum post, G, it will tend slightly to disturb the exact geometrical relations above indicated and to move the center of the ball, $L^1$, slightly out of the line of the fulcrum axis. If the dolly-pin were of great or nearly infinite length, so as to stand nearly parallel with the axis of the fulcrum post, G, such re-adjustment would but slightly affect these relations, while if the dolly-pin were considerably shorter than illustrated, but having its lower end stepped in the socket, $F^2$, (the distance from $F^1$ to $F^2$ remaining unchanged), it would lie more nearly parallel to the actuator arm, F, and adjustment of the sleeve, M, would quite rapidly carry the center of the ball, L¹, out of the line of the fulcrum axis, in which it should stand, thus interfering with the uniformity of pressure upon the actuator arm throughout its range of movement. Incidentally, a dolly-pin in this position would transmit very little pressure transversely of the plane of contact of the cutters, tending rather to increase the journal friction upon the post, G. The problem of the designer therefore has been to make the dolly-pin as long as permissible, without interference with the convenient use of the tool; and this same consideration of convenience has led to the adoption of the inclined adjusting sleeve, M, in spite of the slight inaccuracy introduced by re-adjustment in taking up wear, it being calculated that the inequality of pressure thus resulting will be practically offset by the elasticity of the metal of which the parts are constructed.

For convenience in resharpening, the cutter, J, is of hollow construction, being cupped or recessed at, J¹, between the cutting edges, J², of each tooth; this avoids the necessity of grinding down the large area of useless metal which would be present in a cutter of solid construction. While the shear is in use, however, the short hairs which are cut by it from the animal tend to lodge in these recesses, J¹, and to pack so tightly therein as to raise the cutter, J, out of contact with the comb, H, thus materially decreasing its efficiency. To prevent this undesirable result, the cutters are provided with apertures, J³, opening upwardly from the recesses, J¹, to permit these recesses to clear themselves of the clippings of hair before any packing shall result. In practice it is found that the rapid oscillation of the cutter readily effects this clearing-out of the recesses and prevents any clogging at this point.

I claim:—

A cutter for animal shears having a cutting blade or tooth comprising a pair of oppositely disposed cutting edges, said tooth having a recess between its cutting edges, and having a relief aperture leading out from such recess through the top wall of the tooth.

In testimony whereof I have hereunto set my hand at Chicago, Illinois this 2d day May, 1911.

LEANDER H. LA CHANCE.

Witnesses:
J. H. BURTON,
H. B. ABDILL.